United States Patent [19]

Asbery

[11] Patent Number: 4,995,153
[45] Date of Patent: Feb. 26, 1991

[54] GLASS CUT-OUT WIRE GRIPPER APPARATUS AND METHOD

[75] Inventor: Ray Asbery, Round Rock, Tex.
[73] Assignee: Equalizer Tools, Inc., Round Rock, Tex.
[21] Appl. No.: 491,342
[22] Filed: Mar. 9, 1990
[51] Int. Cl.$^5$ .............................................. A21C 5/00
[52] U.S. Cl. .................................. 30/116; 24/135 R; 30/166.3
[58] Field of Search ...................... 30/116, 166.3, 117; 24/135 R, 135 L

[56] References Cited

FOREIGN PATENT DOCUMENTS 7064 of 1891 United Kingdom .................. 30/116

Primary Examiner—Douglas D. Watts
Attorney, Agent, or Firm—J. Nevin Shaffer; Russell D. Culbertson

[57] ABSTRACT

A glass cut-out device according to the invention includes a length of cutting or cut-out wire adapted to be held at both ends by gripping devices that form handles for manipulating the wire so as to provide a desired cutting action. Each gripping device includes a first handle piece, a first grip surface formed thereon, and a wire end container adapted to receive one end of the cutting wire so that a portion of the wire near the end extends over a portion of the first grip surface. Each gripping device also includes a second handle piece having a second grip surface formed thereon. A suitable connector is associated with each handle piece and adapted to connect the handle pieces together with the first and second grip surfaces positioned closely together so as to grip at least some of the cutting wire extending over the first grip surface and to hold the end of the wire in the wire end container. The first and second handle pieces are preferably each comprised of a generally elongated piece of material with the respective grip surface formed at one end and adapted to connect together with the two grip surfaces generally adjacent or abutting each other to form an elongated handle by which the cutting wire may be manipulated.

14 Claims, 1 Drawing Sheet

U.S. Patent                    Feb. 26, 1991                    Sheet 1 of 1                    4,995,153
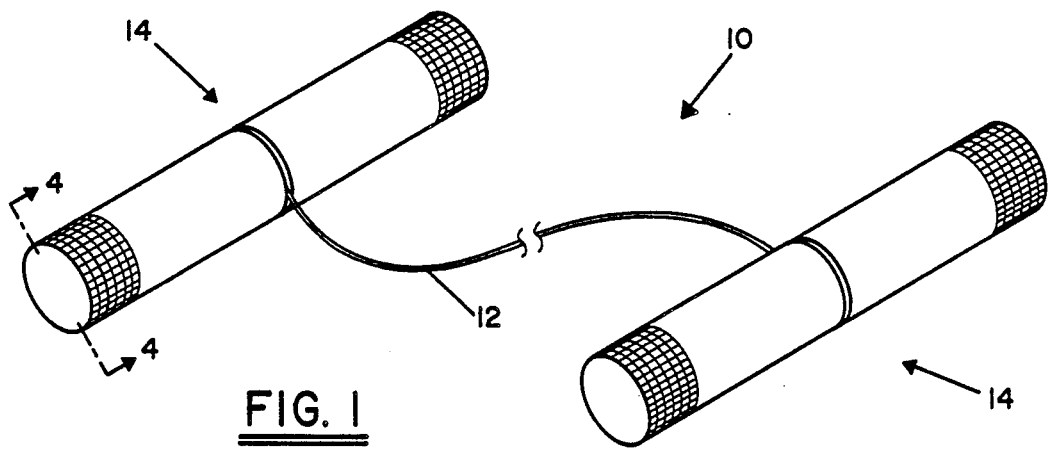
FIG. 1
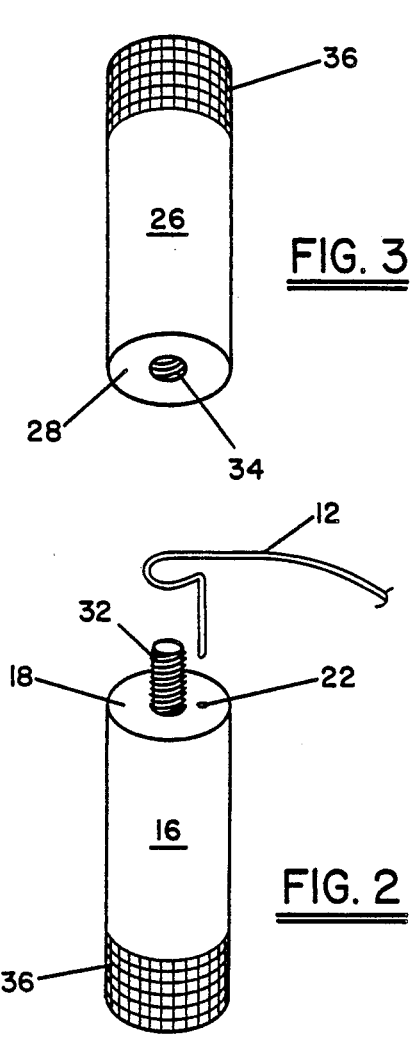
FIG. 3
FIG. 2
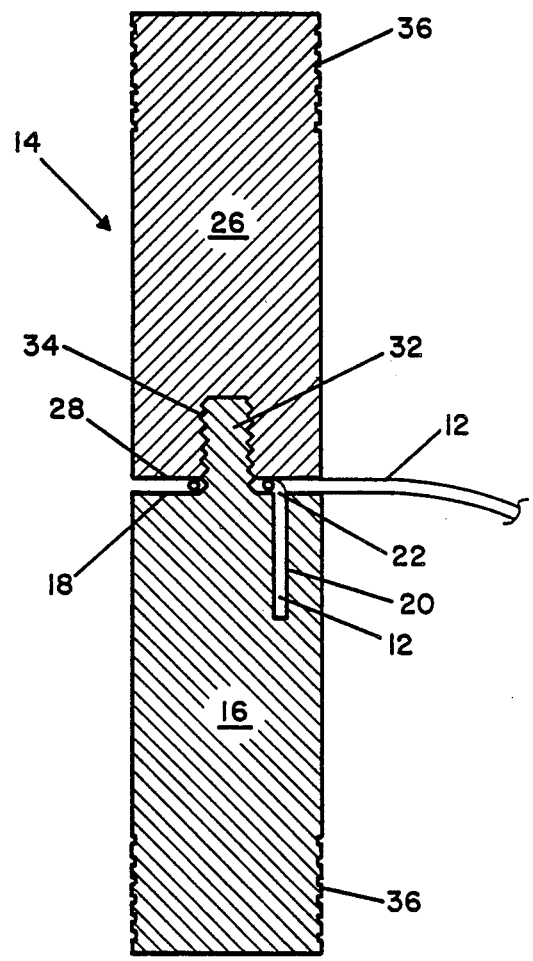
FIG. 4

GLASS CUT-OUT WIRE GRIPPER APPARATUS AND METHOD

BACKGROUND OF THE INVENTION

This invention relates to glass cut-out tools which utilize a flexible cutting wire, and more particularly, to a gripper device for gripping one end of such a cutting wire. The invention also encompasses a method for gripping a cutting wire.

Auto glass is commonly held in place and sealed with an elastomeric sealing material injected or otherwise placed between the glass and a frame formed on the vehicle. This elastomeric sealing material must be cut in order to remove the glass from the frame.

A number of glass cut-out tools and methods have been employed for cutting the elastomeric sealant used to seal auto glass within its frame. One such method utilizes a thin flexible cutting wire that is reciprocated back and forth transversely along the sealant material to cut the seal. In this method, one end of the thin wire is passed through the sealant material to traverse the seal and then the wire is gripped at both ends to supply the pulling and reciprocating force required to cut the sealant material.

Gripping the cutting wire has heretofore involved simply tying an end portion of the cutting wire around a suitable elongated handle in some fashion. However, the process of tying the cutting wire was time consuming and also left the sharp wire end exposed where it could injure a worker manipulating the wire to provide the desired cutting action. Furthermore, it was difficult to tie the wire securely so that it would not release under the pulling and reciprocating force required to cut a particular seal.

SUMMARY OF THE INVENTION

It is a general object of the invention to provide a cutting or cut-out wire gripping device and a method for gripping cutting wires that overcomes the above described problems and others associated with the use of cutting or cut-out wires. Another object of this invention is to provide a glass cut-out device utilizing the unique wire gripping devices.

A glass cut-out device according to the invention includes a length of flexible cutting or cut-out wire and two unique gripping devices for releasably gripping both ends of the wire. Each gripping device is adapted to quickly and securely connect to one end of the cutting wire so as to provide a handle by which a worker may manipulate the wire to provide the desired cutting action. Also, each gripping device includes means for containing the sharp wire end so that it does not pose a threat of injury to the worker using the cut-out device.

Each gripping device comprises a first handle piece, a first grip surface formed on the first handle piece, wire end container means adapted to receive a wire end, and retainer means adapted to connect to the first handle piece for holding the wire end securely in the container. The wire end container is positioned on or within the first handle piece such that once the wire end is received in the container, a portion of the wire near the wire end extends over the first grip surface of the first handle piece. With the wire end contained and a portion of the wire extending over the first grip surface, the retainer means may be connected to the first handle piece in a wire retaining position to securely grip a portion of the wire against the first grip surface.

In the preferred form of the invention, the retainer means comprises a second handle piece having a second grip surface. The two grip surfaces are adapted to be held closely together when the handle pieces are connected so as to grip a portion of the wire there between. The first and second handle pieces are both preferably comprised of a generally elongated piece of material so as to provide a suitable handle when connected together.

The preferred connector for connecting the two handle pieces comprises a connector member connected to and extending from the first grip surface of the first handle piece, and a corresponding connector receptacle extending into the second grip surface of the second handle piece. The connector member is adapted to be received in the connector receptacle to form the desired connection with the first and second grip surfaces held closely together in position to grip a portion of the wire extending there between. In the preferred form of the invention the connector receptacle includes a female threaded surface and the connector member includes a corresponding male threaded surface adapted to thread into the threaded connector receptacle so as to form a secure and releasable connection. A portion of the outer surface of each handle piece also preferably includes a knurled surface to help facilitate threading the two handle pieces together to make the desired connection.

The wire end container in the preferred form of the invention comprises a wire end receptacle or container extending into the first handle piece from the first grip surface with a wire receiving opening in said surface. Because the wire receiving opening is positioned in the first grip surface, a portion of the cutting wire must extend over at least a portion of the first grip surface any time a wire end is received in the container. Thus, the preferred wire end container automatically holds the wire in position to be gripped between the two handle pieces when a wire end is received in the container.

The method of the invention includes first inserting one end of the cutting or cut-out wire into the wire end container of the first handle piece and then extending a portion of the cut-out wire near the inserted wire end across the first grip surface formed on the first handle piece. With a portion of the cutting wire extending over the first grip surface, the method continues with the step of connecting the second handle piece to the first handle piece with the second grip surface formed on the second handle piece held tightly adjacent to or closely to the first grip surface so as to tightly grip the cut-out wire between the two surfaces. This gripping action between the two gripping surfaces formed on the handle pieces also retains the end of the wire in the wire end container where it poses no danger to a worker gripping the handle formed by the two connected handle pieces.

In the preferred form of the invention, the step of connecting the two handle pieces includes positioning the connector member extending from the first grip surface of the first handle piece in the connector receptacle extending into the second handle piece grip surface to form a secure and releasable connection. Such positioning preferably includes threading the connector member into the corresponding threaded connector receptacle. Also, where the connector means includes a connector member extending from the first grip surface of the first handle piece, the method of the invention preferably includes bending a portion of the cut-out wire near the contained wire end around at least a portion of the connector member base prior to connecting the second handle piece. Bending the wire around the connector member base allows the connector member to take some of the force applied to the wire gripping connection when the cut-out device is in use and serves to further secure the wire end to the handle pieces.

These and other objects, advantages, and features of the invention will be apparent from the following description of the preferred embodiments, considered along with the accompanying drawings.

BRIEF DESCRIPTION OF THE DRAWINGS

FIG. 1 is a view in perspective of an auto glass cut-out device embodying the principles of the invention.

FIG. 2 is a somewhat enlarged view in perspective of the preferred first handle piece.

FIG. 3 is a somewhat enlarged view in perspective of the preferred second handle piece.

FIG. 4 is an enlarged view in longitudinal section taken along line 4—4 in FIG. 1.

DESCRIPTION OF THE PREFERRED EMBODIMENTS

Referring to FIG. 1, an auto glass cut-out device 10 embodying the principles of the invention comprises a thin or small gauge cutting or cut-out wire 12 held at each end by wire end gripping devices 14. The cutting wire 12 is adapted to cut through a material such as the elastomeric seal between a piece of auto glass and the glass frame (not shown) as the wire is pulled and reciprocated against a surface of the material. The gripping devices 14 provide convenient handles by which a worker may manipulate the cutting wire 12 to provide the required pulling and reciprocating action.

Referring now to FIGS. 2 and 4, each gripping device 14 includes a first handle piece 16 having a first grip surface 18 formed thereon. Each first handle piece 16 also includes wire end container means, in this form of the invention comprising a wire end receptacle or container 20 extending into the first grip surface 18 and having a wire receiving opening 22. In the preferred form of the invention the first handle piece 16 comprises a generally elongated and cylindrical piece of material having the first grip surface 18 formed on one end thereof.

Referring particularly to FIGS. 3 and 4 each gripping device 14 also includes retaining means adapted to connect with the first handle piece 16 to securely grip one end of the cutting wire 12 and retain the wire end in the wire end container 20. In the illustrated form of the invention the retaining means comprises a second handle piece 26 having a second grip surface 28. Similarly to the first handle piece 16, the second handle piece 26 is preferably comprised of a generally elongated cylindrical piece of material with the second grip surface 28 formed on one end thereof.

As shown best in FIG. 4, each gripping device 14 also includes connector means for connecting the first handle piece 16 to the corresponding second handle piece 26 with the cutting wire 12 gripped between the first grip surface 18 and the second grip surface 28. In the illustrated preferred form of the invention the connector means comprises a connector member 32 extending from the first grip surface 18 of the first handle piece 16, and a connector receptacle 34 extending into the second handle piece 26 through the second grip surface 28. The connector member 32 preferably includes a male threaded surface and the connector receptacle 34 includes a corresponding female threaded surface for making the desired connection between the first handle piece 16 and the second handle piece 26. Also, since the two preferred handle pieces are adapted to screw together to form the desired wire retaining connection, both handle pieces include a knurled surface 36 over a portion thereof to help facilitate threading the preferred connector member 32 into the connector receptacle 34.

Both handle pieces 16 and 26 may be made of a suitable rigid material such as a suitable metal. The connector member 32 is preferably integrally formed with the first handle piece 16 by a suitable machining process although it may be formed separately and then secured to the first handle piece by suitable means. Both the connector receptacle 34 and the wire end container 20 are preferably machined into the respective handle piece.

The method of gripping a cut-out or cutting wire end according to the invention may be described with particular reference to FIGS. 2 through 4. The method includes first inserting one end of the wire 12 into the wire end container 20 through the wire receiving opening 22 and extending a portion of the wire 12 over the first grip surface 18 of the first handle piece. In the illustrated preferred form of the invention, the wire receiving opening 22 of the wire end container 20 is formed in the first grip surface 18 and thus a portion of the wire 12 must necessarily extend over the first grip surface when the wire end is received in the container 20.

With the wire received and the wire end container 20 and a portion of the wire extending over a portion of the first grip surface 18, the method continues with the step of connecting the second handle piece 26 to the first handle piece 16 so as to tightly grip at least a portion of the wire extending over the first grip surface 18 against said surface. In the illustrated form of the invention the second handle piece 26 includes the second grip surface 28 and the two handle pieces are adapted to connect together with the first grip surface 18 and the second grip surface 28 pressed tightly together to grip the cutting wire 12. Also, the preferred step of connecting the first and second handle pieces 16 and 26, respectively, includes threading the male connector member 32 into the female connector receptacle 34 to form the desired connection.

The preferred method of gripping the cutting wire 12 also includes the step of wrapping a portion of the cutting wire around the connector member 32 as indicated in FIG. 2 after inserting the wire end into the wire end container 20 and before connecting the second handle piece 26. The resulting contact between the cutting wire 12 and the connector member 32 transfers some of the pulling force applied to the wire 12 when the cut-out device 10 is in use directly to the connector member and further helps the gripping device to maintain a secure grip on the wire.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:
1. A glass cut-out device comprising:
(a) a length of cutting wire;

(b) a first handle piece for each wire end;
(c) a second handle piece for each first handle piece;
(d) a first grip surface formed on each first handle piece;
(e) an elongated wire and container extending into each first handle piece, each wire end container having a wire receiving opening through which a wire end may be inserted and a closed end at the end opposite to the wire receiving opening, each wire end container also being positioned on the first handle piece so that a portion of the wire near the wire end extends over a portion of the first grip surface when an end of the cutting wire is received in the container;
(f) a second grip surface formed on each second handle piece; and
(g) connector means for connecting each first handle piece to one of the second handle pieces with the first and second grip surfaces held closely together so as to grip at least some of the cutting wire extending over the first grip surface.

2. The glass cut-out device of claim 1 wherein:
(a) each first handle piece comprises a generally elongated piece of material with the first grip surface formed at one end;
(b) each second handle piece comprises a generally elongated piece of material with the second grip surface formed at one end thereof; and
(c) the first and second handle pieces form a generally elongated handle for holding one end of the cutting wire when connected together by the connector means.

3. The glass cut-out device of claim 2 wherein each connector means comprises:
(a) a connector member extending from the first grip surface of the first handle piece; and
(b) a connector receptacle formed in the second grip surface of the second handle piece for receiving and releasably connecting with the connector member and the corresponding first handle piece.

4. The glass cut-out device of claim 3 wherein:
(a) the wire receiving opening of each wire end container is positioned on the first grip surface of the respective first handle piece.

5. The glass cut-out device of claim 4 wherein:
(a) the connector receptacle includes a female threaded surface; and
(b) the connector member includes a male threaded surface adapted to thread into the threaded connector receptacle to form a releasable connection.

6. The glass cut-out device of claim 5 wherein each first and second handle piece includes a knurled portion on its outer surface.

7. A gripping device for gripping one end of a glass cut-out wire, said gripping device comprising:
(a) a first handle piece;
(b) a first grip surface formed on the first handle piece;
(c) a wire end container extending into the first handle piece and having a wire receiving opening positioned on the first grip surface, the wire end container for containing the end of the cut-out wire so that a portion of the wire near the wire end extends over a portion of the first grip surface;
(d) retainer means for retaining the wire end contained in the wire end container means securely therein and for gripping at least a portion of the wire extending over the first grip surface when the retainer means is connected in a wire retaining position to the first handle piece; and
(e) connector means for connecting the retainer means to the first handle piece in the wire retaining position.

8. The gripping device of claim 7 wherein the retainer means comprises:
(a) a second handle piece adapted to be connected by the connector means to the first handle piece; and
(b) a second grip surface formed on the second handle piece adapted to be held closely to the first grip surface so as to tightly grip at least a portion of the wire extending over the first grip surface when the second handle piece is connected to the first handle piece.

9. The gripping device of claim 8 wherein:
(a) the first handle piece comprises a generally elongated piece of material with the first grip surface formed on one end thereof; and
(b) the second handle piece comprises a generally elongated piece of material with the second grip surface formed on one end thereof.

10. The gripping device of claim 9 wherein the connector means comprises:
(a) a connector member extending from the first grip surface of the first handle piece; and
(b) a connector receptacle extending into the second grip surface of the second handle piece for receiving and releasably connecting with the connector member.

11. The gripping device of claim 10 wherein:
(a) the connector receptacle includes a female threaded surface; and
(b) the connector member includes a male threaded surface adapted to thread into the threaded connector receptacle so as to form a secure and releasable connection.

12. The gripping device of claim 11 wherein:
(a) the first handle piece and the second handle piece both include a knurled surface over a portion thereof.

13. A method of gripping one end of a glass cut-out wire, said method comprising the steps of:
(a) inserting the cut-out wire end into a wire end container of a first handle piece through a wire receiving opening;
(b) extending a portion of the cut-out wire near the inserted wire end across a first grip surface of the first handle piece and around at least a portion of a base of a connector member extending from the first grip surface of the first handle piece; and
(c) connecting a second handle piece to the first handle piece so that a second grip surface of the second handle piece is held tightly adjacent to the first grip surface so as to tightly grip the cut-out wire between the first and second surfaces and so as to retain the cut-out wire end in the wire end container.

14. The method of claim 13 wherein the connector member includes a male threaded portion and the second handle piece includes a connector receptacle extending into the second handle piece through the second grip surface and having a female threaded portion, and the step of connecting includes threading the connector member into the connector receptacle to form a secure but releasable connection between the first handle piece and the second handle piece.

* * * * *

UNITED STATES PATENT AND TRADEMARK OFFICE
CERTIFICATE OF CORRECTION

PATENT NO. : 4,995,153
DATED : February 26, 1991
INVENTOR(S) : RAY ASBERY

It is certified that error appears in the above-identified patent and that said Letters Patent is hereby corrected as shown below:

In Claim 1, column 5, line 5 of the Patent, change "and" to --end--.

Signed and Sealed this

Twenty-third Day of June, 1992

Attest:

DOUGLAS B. COMER

Attesting Officer     Acting Commissioner of Patents and Trademarks